US011007927B2

(12) United States Patent
Shido et al.

(10) Patent No.: US 11,007,927 B2
(45) Date of Patent: May 18, 2021

(54) DISPLAY DEVICE FOR MOVABLE OBJECT

(71) Applicant: KOITO MANUFACTURING CO., LTD., Tokyo (JP)

(72) Inventors: Masaya Shido, Shizuoka (JP); Yoshinori Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/884,759

(22) Filed: May 27, 2020

(65) Prior Publication Data

US 2020/0282898 A1 Sep. 10, 2020

Related U.S. Application Data

(63) Continuation of application No. PCT/JP2018/042076, filed on Nov. 14, 2018.

(30) Foreign Application Priority Data

Nov. 28, 2017 (JP) ............................ JP2017-228054

(51) Int. Cl.
*B60Q 1/34* (2006.01)
*B60Q 1/26* (2006.01)

(52) U.S. Cl.
CPC ................................ *B60Q 1/2603* (2013.01)

(58) Field of Classification Search
CPC .......... B60Q 1/2603; B60Q 1/28; B60Q 1/34; B60Q 1/02
See application file for complete search history.

(56) References Cited

U.S. PATENT DOCUMENTS 3,794,972 A * 2/1974 Van Ostrom ......... G01P 15/165 340/467
4,213,115 A 7/1980 Wetzel
5,949,346 A 9/1999 Suzuki et al.
6,133,852 A * 10/2000 Tonkin .................. B60Q 1/444 340/464
7,167,086 B1 * 1/2007 Goins ...................... B60Q 1/34 340/463

(Continued)

FOREIGN PATENT DOCUMENTS

JP 09265091 A 10/1997
JP 2002211314 A 7/2002

(Continued)

OTHER PUBLICATIONS

International Search Report (PCT/ISA/210) dated Jan. 29, 2019 issued in International Patent Application No. PCT/JP2018/042076, with English translation (11 pages).

(Continued)

*Primary Examiner* — Phung Nguyen

(74) *Attorney, Agent, or Firm* — Buchanan Ingersoll & Rooney PC

(57) ABSTRACT

A display device for a movable object includes: a display unit provided such that it is visible from outside a movable object; and a controller that causes the display unit to display information indicating a status of the movable object. The controller changes a display mode of the information displayed on the display unit in accordance with variation in the status of the movable object.

6 Claims, 12 Drawing Sheets

100
2(2c)
2(2a)
2(2b)

(56) References Cited

U.S. PATENT DOCUMENTS

| | | | | |
|---|---|---|---|---|
| 2005/0179533 | A1* | 8/2005 | Stevenson | B60Q 1/34 340/475 |
| 2011/0098855 | A1 | 4/2011 | Kurth et al. | |
| 2015/0330588 | A1 | 11/2015 | Snyder et al. | |
| 2016/0207449 | A1* | 7/2016 | Noble | B60Q 1/34 |
| 2017/0229053 | A1 | 8/2017 | Ishizuka et al. | |
| 2019/0064810 | A1* | 2/2019 | Jiang | G06K 9/6262 |

FOREIGN PATENT DOCUMENTS

| | | | |
|---|---|---|---|
| JP | 2014149986 | A | 8/2014 |
| JP | 2017140929 | A | 8/2017 |
| KR | 1020060078812 | A | 7/2006 |

OTHER PUBLICATIONS

International Preliminary Report on Patentability (PCT/IB/373) and Written Opinion (PCT/IB/237) dated Jun. 2, 2020 issued in International Patent Application No. PCT/JP2018/042076, with English translation (25 pages).

* cited by examiner

DISPLAY DEVICE FOR MOVABLE OBJECT

CROSS-REFERENCE TO RELATED APPLICATIONS

This application is based upon and claims the benefit of priority from the prior Japanese Patent Application No. 2017-228054, filed on Nov. 28, 2017 and International Patent Application No. PCT/JP2018/042076, filed on Nov. 14, 2018, the entire content of each of which is incorporated herein by reference.

BACKGROUND

Field of the Invention

The present invention relates to a display device for movable objects and, in particular, a display device used in a movable object such as a vehicle.

Description of the Related Art

Movable objects such as an automobile are provided with a display device for showing the status of the movable object to people outside. The display device is embodied by a sign lamp such as a turn-signal lamp and a tail-and-stop lamp. People outside such as a pedestrian and a passenger of another movable object around the movable object can know the status (e.g., the direction of travel or the status of deceleration) of the movable object according to the sign lamp.

Patent Literature 1: JP2014-149986

By presenting status information on a movable object to people around, the safety of the movable object and people outside is improved. Meanwhile, further improvement in safety is called for.

SUMMARY OF THE INVENTION

The present invention addresses the above-described issue, and a purpose thereof is to provide a technology of further improving the safety of the movable object and people around.

An embodiment of the present invention relates to a display device for a movable object. The device includes: a display unit provided such that it is visible from outside a movable object; and a controller that causes the display unit to display information indicating a status of the movable object. The controller changes a display mode of the information displayed on the display unit in accordance with variation in the status of the movable object.

Another embodiment of the present invention relates to a display device for a movable object. The display device includes: a plurality of lamps provided on an outer circumference of the movable object, each of the lamps including a first light irradiation part that irradiates light to be irradiated a space in front in a direction of travel of the movable object and a second light irradiation part irradiates light to be irradiated a space behind in the direction of travel of the movable object; a sensing unit that senses the direction of travel of the movable object; and a lighting controller that controls a lighting status of the lamps in such a manner as to light the first light irradiation part of the lamp located forward in the direction of travel of the movable object and lights the second light irradiation part of the lamp located rearward in the direction of travel of the movable object.

Optional combinations of the aforementioned constituting elements, and replacement of implementation of the present invention in the form of methods, devices, systems, etc. may also be practiced as optional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
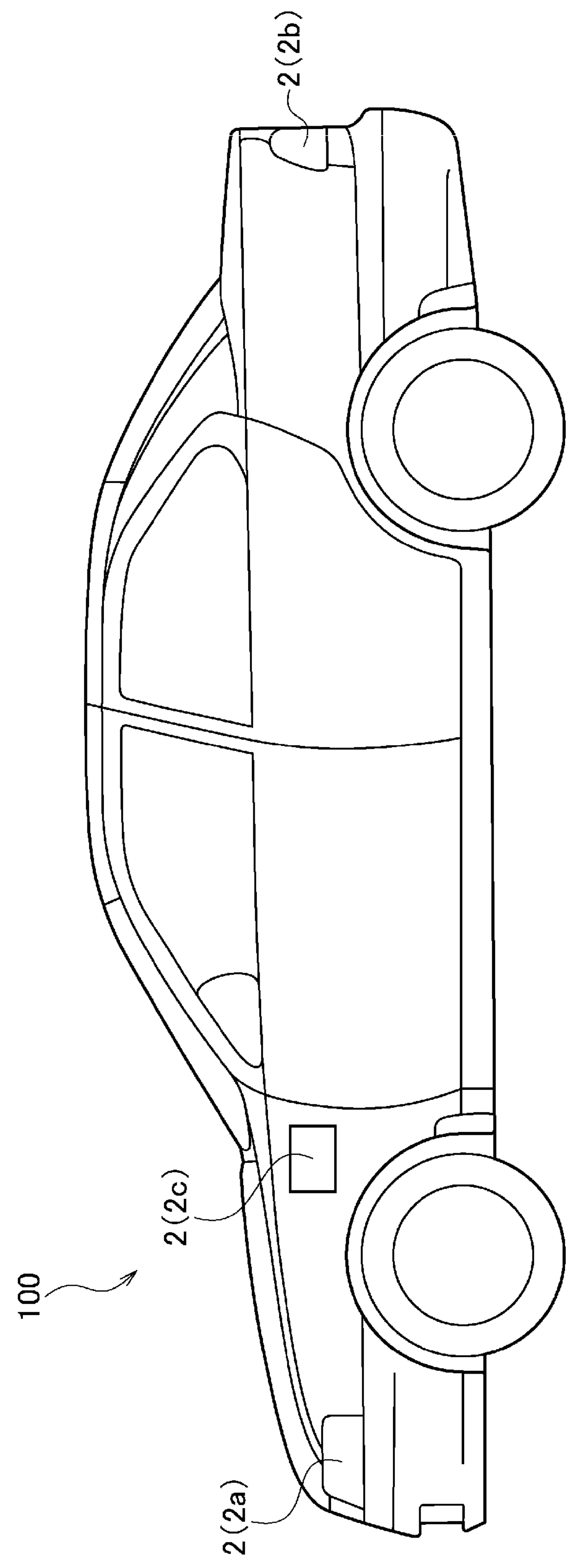
FIG. 1 shows an appearance of a movable object in which a display device for a movable object according to embodiment 1 is mounted.

An embodiment of the present invention relates to a display device for a movable object. The device includes: a display unit provided such that it is visible from outside a movable object; and a controller that causes the display unit to display information indicating a status of the movable object. The controller changes a display mode of the information displayed on the display unit in accordance with variation in the status of the movable object.

The controller may cause information indicating a current status or a future status of the movable object to be displayed, as the information indicating the status of the movable object. In a case of causing the display unit to display the information indicating the current status, the controller may change the display mode of the information in accordance with the degree of the status, and in a case of causing the display unit to display the information indicating the future status, the controller may change the display mode of the information in accordance with at least one of an interval between a position where the status is expected to occur and a current position of the movable object and an interval between a point of time when the status is expected to occur and a current time. In the embodiments above, the controller may cause information indicating that the movable object is decelerating to be displayed as information indicating a current status and change the display mode in accordance with a magnitude of deceleration. In the embodiments above, the controller may change a size of display in accordance with the magnitude of deceleration. In the embodiments above, the display device may further include a brightness adjuster that decreases brightness of the display unit as the size of display is increased.

In the embodiments above, the controller may cause information indicating a turn of the movable object to be displayed as information indicating a future status and change the display mode in accordance with a distance between a position where the turn is expected to occur and a current position of the movable object. In the embodiments above, the information indicating a turn may include a first displayed part indicating a direction of travel of the movable object and a second displayed part indicating a direction of turn, and the controller may reduce a size of the first displayed part as the current position of the movable object approaches the position where the turn is expected to occur.

In the embodiments above, the display unit may include a first area for displaying the information indicating the status of the movable object and a second area for displaying information different from the information indicating the status of the movable object, and, when information indicating a predetermined status of the movable object is displayed in the first area, the controller may prohibit display of information in the second area. In the embodiments above, the display unit may include a first area for displaying the information indicating the status of the movable object and a second area for displaying the information indicating the status of the movable object and information different from the information indicating the status of the movable object, and the controller may cause information indicating a predetermined first status to be displayed in the first area and cause information indicating a predetermined second status to be displayed in the first area and in the second area.

Another embodiment of the present invention relates to a display device for a movable object. The display device includes: a plurality of lamps provided on an outer circumference of the movable object, each of the lamps including a first light irradiation part that irradiates light to be irradiated a space in front in a direction of travel of the movable object and a second light irradiation part irradiates light to be irradiated a space behind in the direction of travel of the movable object; a sensing unit that senses the direction of travel of the movable object; and a lighting controller that controls a lighting status of the lamps in such a manner as to light the first light irradiation part of the lamp located forward in the direction of travel of the movable object and lights the second light irradiation part of the lamp located rearward in the direction of travel of the movable object.

Hereinafter, the present invention will be described based on preferred embodiments with reference to the accompanying drawings. The embodiments do not intend to limit the scope of the invention but exemplify the invention. Not all of the features and the combinations thereof described in the embodiments are necessarily essential to the invention. Identical or like constituting elements, members, processes shown in the drawings are represented by identical symbols and a duplicate description will be omitted as appropriate. The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others.

Embodiment 1

Figure 2:
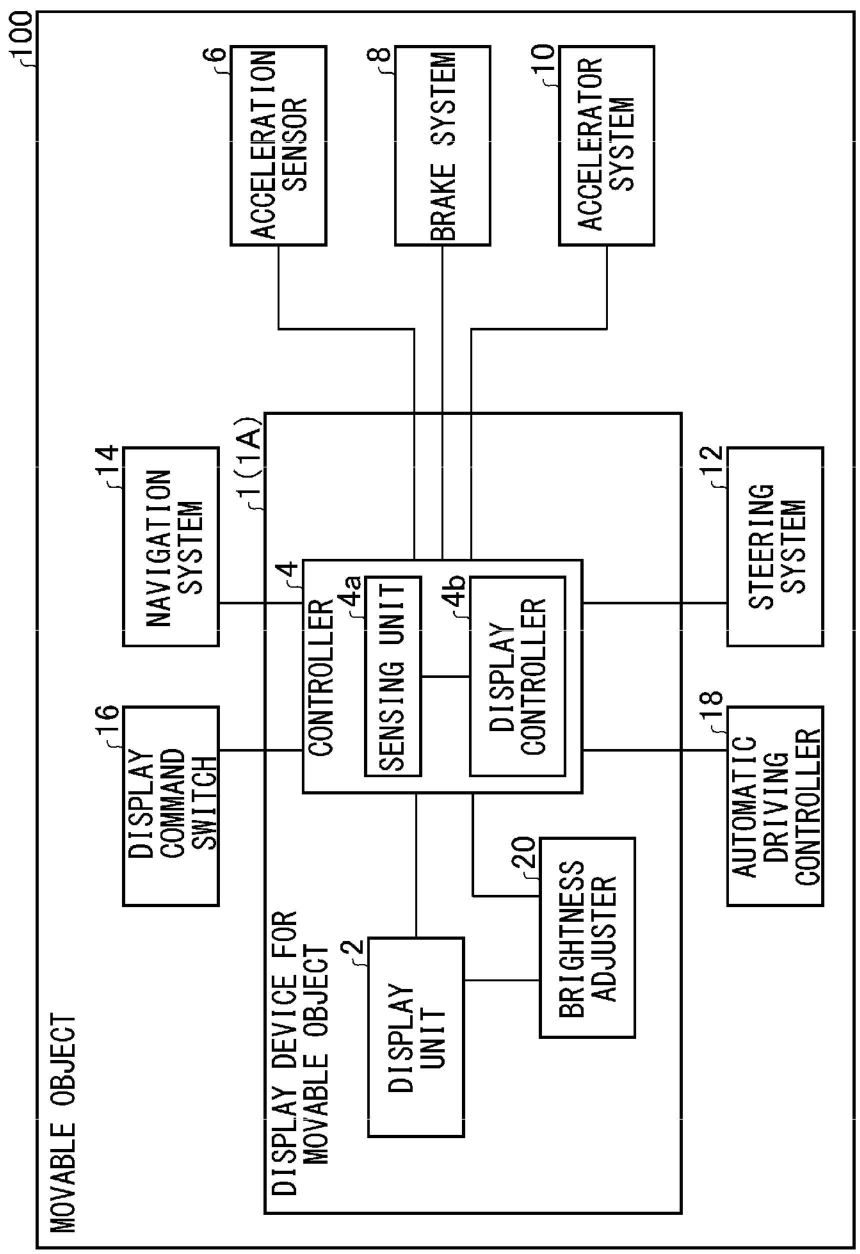
FIG. 2 is a functional block diagram for illustrating the display device for a movable object according to embodiment 1.

FIG. 1 shows an appearance of a movable object in which a display device for a movable object according to embodiment 1 is mounted. FIG. 2 is a functional block diagram for illustrating the display device for a movable object according to embodiment 1. FIG. 2 depicts the features as functional blocks. These functional blocks are implemented in hardware by a device or a circuit such as a CPU and a memory of a computer, and in software by a computer program, etc. It will be understood by those skilled in the art that the functional block may be implemented in a variety of manners by a combination of hardware and software.

The display device 1 (1A) for a movable object according to this embodiment includes a display unit 2 and a controller 4. The display unit 2 is exemplified by a thin display such as a light emitting diode (LED) display, an organic electroluminescence display, and a liquid crystal display. The liquid crystal display may be of self-luminous type or reflective type. The display unit 2 is provided such that it is visible from outside a movable object 100.

FIG. 1 shows an automobile as an example of the movable object 100. By way of one example, a first display unit 2*a* is provided on the front face of the movable object 100, a second display unit 2*b* is provided on the back face, and third display units 2*c* are provided on the respective side surfaces. The first display unit 2*a* may be built into the headlamp, and the second display unit 2*b* may be built into the rear combination lamp, respectively. Where the first display unit 2*a*-third display units 2*c* are not distinguished, these will be referred to as "display unit 2".

The movable object 100 is not limited to a vehicle and may be a self-propelled robot, etc. The display unit 2 may be provided in the front door, rear door, rear fender, trunk hood, bonnet, roof, front bumper, etc. The requirement for the display unit 2 is that it is visible from outside the movable object 100. The display unit 2 may be provided inside the movable object 100 (e.g., in the windshield).

The controller 4 controls the display content on the display unit 2. The controller 4 is mounted inside the movable object 100 (e.g., in the dashboard). An acceleration sensor 6 for sensing the acceleration of the movable object 100 is connected to the controller 4. The controller 4 can sense a positive acceleration or a negative acceleration of the movable object 100 by receiving a signal from the acceleration sensor 6. Hereinafter, a positive acceleration will simply be referred to as "acceleration", and a negative acceleration will be referred to as "deceleration". The controller 4 can also calculate the acceleration and deceleration of the movable object 10 by receiving a signal from the speed sensor of the movable object 100.

A brake system 8 of the movable object 100 is connected to the controller 4. The controller 4 can estimate the deceleration of the movable object 100 by receiving a signal from the brake system 8. Further, an accelerator system 10 of the movable object 100 is connected to the controller 4. The controller 4 can estimate the acceleration of the movable object 100 by receiving a signal from the accelerator system 10. Further, a steering system 12 of the movable object 100 is connected to the controller 4. The controller 4 can sense the steering angle of the steering provided in the movable object 100 by receiving a signal from the steering system 12. Further, the controller 4 can estimate the direction of travel of the movable object 100 by synthesizing information acquired from the brake system 8, the accelerator system 10, the steering system 12, etc.

Further, a navigation system 14 of the movable object 100 is connected to the controller 4. The controller 4 can acquire information related to the destination of the movable object 100 or information related to a route to the destination, by receiving a signal from the navigation system 14. This makes it possible to know the future operating condition of the movable object 100. Further, a display command switch 16 for requesting the status information on the movable object 100 (e.g., turn, emergency stop, etc. of the movable object 100) to be displayed on the display unit 2 is connected to the controller 4. The display command switch 16 is manipulated by, for example, the driver of the movable object 100, a passenger other than the driver, etc. Further, an automatic driving controller 18 for controlling automatic driving of the movable object 100 is connected to the controller 4. The movable object 100 according to this embodiment is capable of switching between automatic driving and manual driving. The controller 4 can sense that the movable object 100 is driven automatically by receiving a signal from the automatic driving controller 18.

The controller 4 causes information indicating the status of the movable object 100 to be displayed on the display unit 2. Further, the controller 4 changes the display mode of the information displayed on the display unit 2 in accordance with the variation in the status of the movable object 100. The controller 4 includes a sensing unit 4*a* that senses the status of the movable object 100 and a display controller 4*b* that changes the display mode in accordance with the status of the movable object 100. This makes it possible to present a larger amount of information to people outside such as a pedestrian and a passenger of another movable object. It also enhances visual attraction to people outside. The signal from the sensor or the system connected to the controller 4 is received by the sensing unit 4*a*. The display controller 4*b* receives the sensing result from the sensing unit 4*a* and transmits a signal requesting the display unit 2 to change the display mode.

Figure 3:
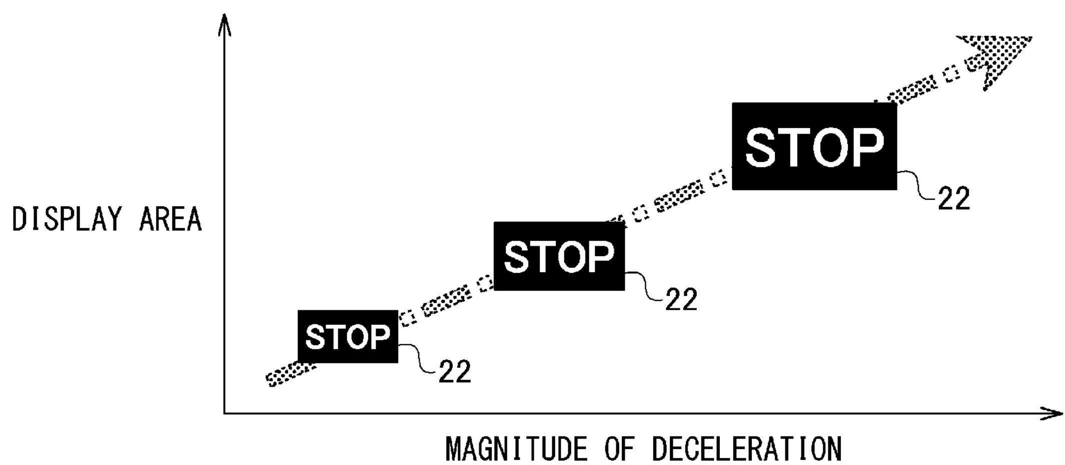
FIG. 3 is a schematic diagram illustrating the correspondence between the size of display and the deceleration of the movable object.

More specifically, the controller 4 according to this embodiment causes the display unit 2 to display, as the information indicating the status of the movable object 100, information indicating the current status of the movable object 100. The controller 4 also changes the display mode of the information in accordance with the degree of the current status of the movable object 100. Information indicating the current status of the movable object 100 is exemplified by information indicating that the movable object 100 is decelerating. The controller 4 changes the display mode in accordance with the magnitude of deceleration. The change in the display mode is exemplified by change in the size of display. FIG. 3 is a schematic diagram illustrating the correspondence between the size of display (display area) and the deceleration of the movable object.

When the controller 4 senses that the movable object 100 is decelerating based on the signal received from the acceleration sensor 6, the controller 4 causes the display unit 2, and, in particular, the second display unit 2*b*, to display information 22 indicating that the movable object 100 is decelerating. By way of one example, the information 22 indicating deceleration is shaped such that characters "STOP" are arranged inside a horizontally elongated rectangle. An arbitrary combination of characters, figures, and symbols may be used to show deceleration.

Further, the controller 4 changes the size of display in steps or continuously depending on the magnitude of deceleration. This makes it possible to present further information such as the degree of deceleration, emergency, etc. of the movable object 100 to people outside. It also enhances visual attraction to people outside. In the example shown in FIG. 3, the greater the deceleration, the larger the size of display. For example, the controller 4 maintains a conversion table that maps the deceleration to the size of display and determines the size of display in accordance with the current deceleration using the conversion table. The controller 4 then causes the display unit 2 to display the information in the determined size. Because the variation of the display mode itself affects improvement in visual attraction significantly, the size of display may be decreased as the deceleration is increased.

The display device 1 for a movable object further includes a brightness adjuster 20 that changes the brightness of the display unit 2 in accordance with the size of display. For example, the brightness adjuster 20 decreases the brightness of the display unit 2 as the size of display is increased. The brightness adjuster 20 is connected to the controller 4 and receives a signal indicating the size of display from the controller 4. For example, the brightness adjuster 20 maintains a conversion table that maps the size of display to the brightness of the display unit 2 and uses the conversion table to determine the brightness in accordance with the size of display. The brightness adjuster 20 adjusts the brightness of the display unit 2 by regulating the power supply circuit of the display unit 2. This inhibits the display from becoming excessively bright and giving glare to people outside as a result of a larger display size. It also inhibits power consumption of the display unit 2.

In the case the size of display is increased as the deceleration is increased, the display will be minimized in a status in which the movable object 100 comes at a stop, i.e., in a status of zero acceleration and deceleration. In connection with this, the controller 4 minimizes the size of display when a predetermined period of time (e.g., several seconds) elapses since the stop of the movable object 100 in a situation in which the movable object 100 undergoes a large deceleration until immediately before the stop such as when the movable object 100 comes to an abrupt stop. In other words, the controller 4 maintains the large size of display for a predetermined period of time regardless of the actual deceleration of the movable object 100 and then minimizes the display. This makes it possible to make the stop of the movable object 100 more properly known to people outside and improve the safety. In the case the amount of variation, occurring since the statue in which the movable object 100 is undergoing the first deceleration until the deceleration reaches zero, in the deceleration per a unit time is excess of a predetermined threshold value, the controller 4 maintains the size of display corresponding to the first deceleration for a predetermined period of time.

In the case the stopped status of the movable object 100 lasts for a predetermined period of time or longer, the controller 4 may control the size of display to be smaller than the size corresponding to zero deceleration. This reduce the glare given to people outside. It also inhibits power consumption of the display unit 2. In this case, too, the controller 4 may decrease the size of display after a predetermined period of time elapses since the stop of the movable object 100. This makes it possible to let people outside know the stop of the movable object 100 more properly and improve the safety.

The controller 4 according to this embodiment causes the display unit 2 to display, as the information indicating the status of the movable object 100, information indicating the future status of the movable object 100. Further, the controller 4 changes the display mode of the information in accordance with at least one of the interval between the position where the status is expected to occur and the current position of the movable object 100 and the interval between the point of time when the status is expected to occur and the current time.

Figure 4A:
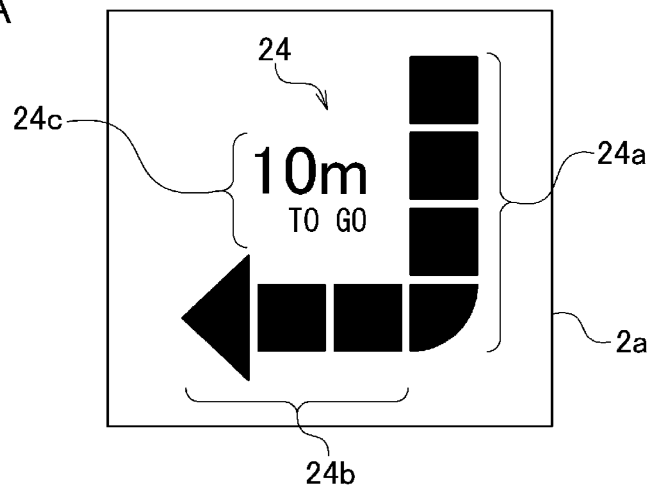
FIGS. 4A-4C are schematic diagrams illustrating the correspondence between display modes of information displayed on the first display unit and the position of turn of the movable object.
Figure 4B:
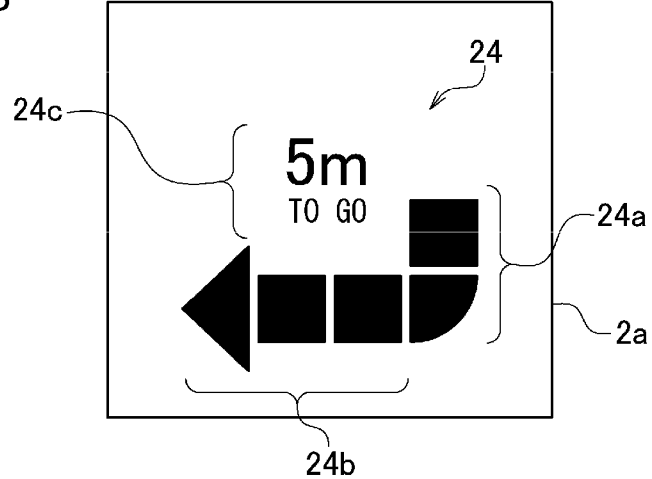
Figure 4C:
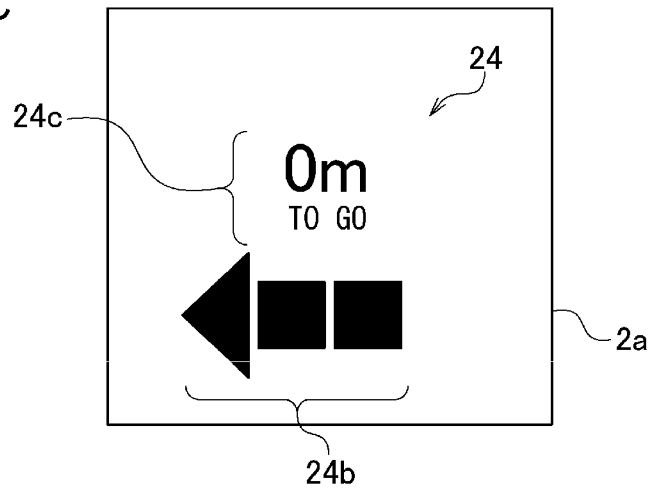
Figure 5A:
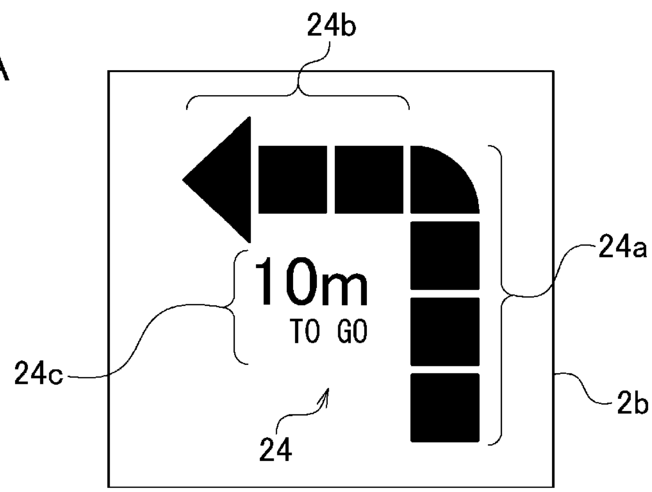
FIGS. 5A-5C are schematic diagrams illustrating the correspondence between display modes of information displayed on the second display unit and the position of turn of the movable objects.
Figure 5B:
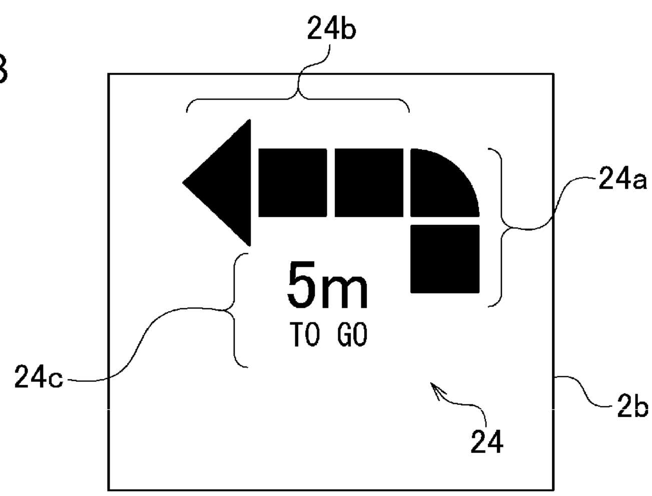
Figure 5C:
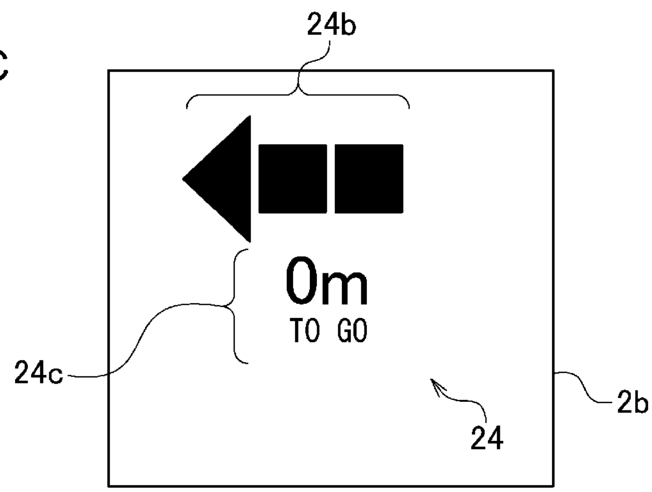
Figure 6A:
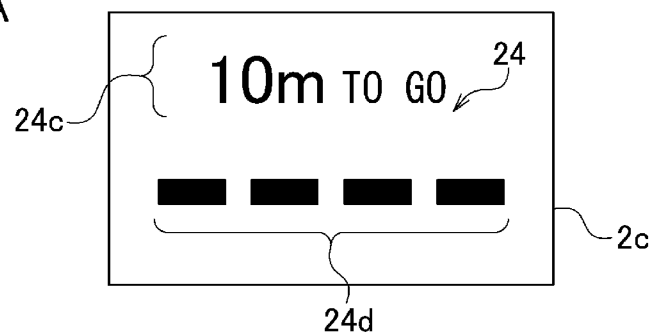
FIGS. 6A-6C are schematic diagrams illustrating the correspondence between display modes of information displayed on the third display unit and the position of turn of the movable objects.
Figure 6B:
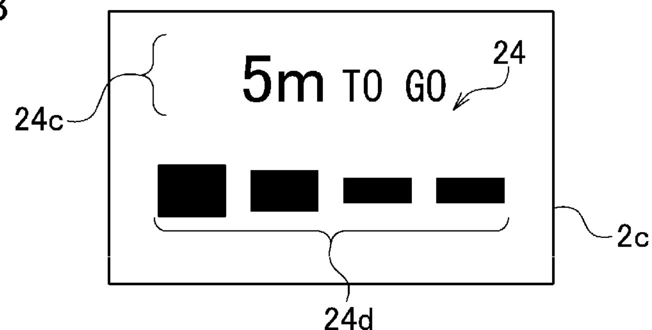
Figure 6C:
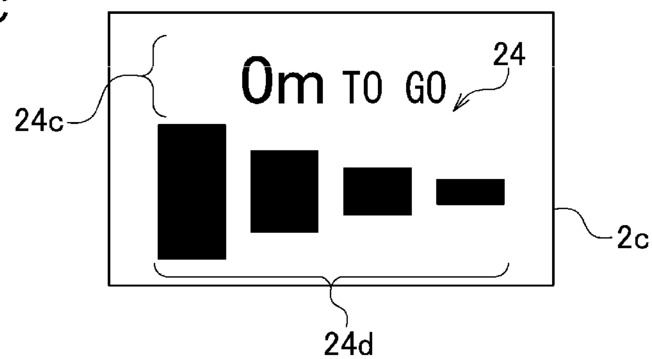

The information indicating the future status of the movable object 100 is exemplified by information indicating a turn of the movable object 100. Further, by way of one example, the controller 4 changes the display mode in accordance with the distance between the position where the turn is expected to occur and the current position of the movable object 100. FIGS. 4A-4C are schematic diagrams illustrating the correspondence between display modes of information displayed on the first display unit and the position of turn of the movable object. FIGS. 5A-5C are schematic diagrams illustrating the correspondence between display modes of information displayed on the second display unit and the position turn of the movable objects. FIGS. 6A-6C are schematic diagrams illustrating the correspondence between display modes of information displayed on the third display unit and the position of turn of the movable objects.

When the controller 4 senses that the movable object 100 is expected to make a turn by referring to the signal received from the navigation system 14, the controller 4 causes the first display unit 2*a* and the second display unit 2*b* to display information 24 indicating a turn of the movable object 100. The controller 4 causes the information 24 indicating a turn to be displayed at a position a predetermined distance ahead (e.g., the position 10 m ahead) of the position of turn. As shown in FIGS. 4A and 5A, the information 24 indicating a turn includes a first displayed part 24*a* indicating the current direction of travel of the movable object 100 and a second displayed part 24*b* indicating the expected direction of turn.

The first displayed part 24*a* is shaped such that multiple small pieces are arranged at predetermined intervals in a direction corresponding to the direction of travel of the movable object. Stated otherwise, the first displayed part 24*a* is shaped such that a thin stripe extending in a direction corresponding to the direction of travel is split into multiple pieces. The second displayed part 24*b* is shaped like an arrow facing the direction of turn. The arrow of the second displayed part 24*b* is shaped such that multiple small pieces forming the shaft and the small piece forming the arrowhead are arranged at predetermined intervals in the direction of turn of the movable object 100.

The first displayed part 24*a* and the second displayed part 24*b* are arranged such that the small piece at one end of the first displayed part 24*a* and the piece at the end of second displayed part 24*b* opposite to the arrowhead are proximate to each other and that the entirety forms a shape of letter L. The controller 4 causes the small pieces to be displayed sequentially, beginning with the other end of the first displayed part 24*a* (the end farther from the second displayed part 24*b*). In other words, the controller 4 performs so-called sequential lighting.

Further, the controller 4 reduces the size of the first displayed part 24*a* as the current position of the movable object 100 approaches the position where the turn is expected to occur. In this embodiment, the controller 4 hides, as shown in FIG. 4B, FIG. 4C, FIG. 5B, and FIG. 5C, the small pieces forming the first displayed part 24*a* sequentially, beginning with the other end of the first displayed part 24*a*, as the movable object 100 approaches the position where the turn is expected to occur. Therefore, the closer the movable object 100 approaches the position where the turn is expected to occur, the shorter first displayed part 24*a* becomes progressively. This makes it possible to present information such as the direction of turn and the timing of turn of the movable object 100 to people outside. It also enhances visual attraction to people outside. The same advantage is achieved by displaying the information 24 on a turn at a point of time before of the point of time when the turn is expected to occur by a predetermined period of time and reducing the size of the first displayed part 24*a* as the time interval between the current time and the point of time when the turn is expected to occur becomes shorter.

Referring to FIGS. 4A-4C and FIGS. 5A-5C, the first displayed part 24*a* and the second displayed part 24*b* substantially form a right angle. However, the embodiment is not limited to this configuration. The inclination of the second displayed part 24*b* relative to the first displayed part 24*a* may be adjusted so that the angle formed by the first displayed part 24*a* and the second displayed part 24*b* matches the angle formed by the direction of travel of the movable object 100 and the direction of turn. This makes it possible to present an accurate direction of turn of the movable object 100 to people outside.

The information 24 indicating a turn also includes a third displayed part 24*c* showing a numerical value determined by the distance from the current position of the movable object 100 to the position where the turn is expected to occur. The controller 4 decreases the numerical value of the third displayed part 24*c* progressively as the distance to the position where the turn is expected to occur becomes smaller. As shown in the figure, the numerical value may be an actual distance from the current position of the movable object 100 to the position where the turn is expected to occur or a representative numerical value derived from defining a plurality of distance zones and allocating values to the respective zones. Further, the numerical value may be an actual period of time that elapses since the current time until the point of time when the turn is expected to occur or a representative value derived from defining a plurality of time zones and allocating values to the respective zones. For example, the timing of turn of the movable object 100 can be made known to people outside by varying (e.g., decrementing) the representative numerical value as the time interval between the current time and the point of time when the turn is expected to occur becomes shorter.

When it is sensed that the movable object 100 is expected to make a turn based on the signal received from the navigation system 14, the controller 4 also causes the third display unit 2*c* to display the information 24 indicating a turn of the movable object 100. For example, the controller 4 causes only the third display unit 2*c* facing the direction of turn of the movable object 100 to display the information 24 indicating a turn. The controller 4 causes the information 24 indicating a turn to be displayed a predetermined distance ahead (e.g., the position 10 m ahead) of the position of turn.

As shown in FIG. 6A, one example of the information 24 indicating a turn includes the third displayed part 24*c* and a fourth displayed part 24*d*.

The fourth displayed part 24*d* indicates the direction of travel and the direction of turn of the movable object 100. The fourth displayed part 24*d* is shaped such that multiple small pieces are arranged at predetermined intervals in the direction of travel of the movable object 100. The controller 4 causes the small pieces to be displayed sequentially, beginning with the piece in the fourth displayed part 24*d* toward the back of the movable object 100. In other words, the controller 4 performs so-called sequential lighting. Referring to FIGS. 6A-6C, the right side in the figure is toward the back of the movable object 100.

Further, the controller 4 increases the size of at least a part of the display as the current position of the movable object 100 approaches the position where the turn is expected to occur. In this embodiment, the controller 4 progressively increases, as shown in FIG. 6B and FIG. 6C, the size of small pieces forming the fourth displayed part 24*d* in the vertical direction as the movable object 100 approaches the position where the turn is expected to occur. Further, the controller 4 increases the number of small pieces for which the size is changes, beginning with the piece toward the front of the movable object 100, as the movable object 100 approaches the position where the turn is expected to occur. In other words, the controller 4 changes the size of the only the first small piece located at the end toward the front of the movable object 100, when the movable object 100 is at a first position spaced away from the position where the turn is expected to occur by a predetermined distance. When the movable object 100 moves to a second position closer to the position where the turn is expected to occur than the first position, the controller 4 changes the size of the second small piece from the front of the movable object 100, as shown in FIG. 6B. In this step, the size of the first small piece is configured to be larger than when the movable object 100 is at the first position. The same is true of the third and subsequent small pieces.

Seeing the forth displayed part 24*d* as a whole, the fourth displayed part 24*d* progressively expands, beginning with the end toward the front of the movable object 100, as the movable object 100 approaches the position where the turn is expected to occur. This makes it possible to present information such as the direction of turn and the timing of turn of the movable object 100 to people outside. It also enhances visual attraction to people outside. The same advantage is achieved by displaying the information 24 on a turn at a point of time before the point of time when the turn is expected to occur by a predetermined period of time and expanding the fourth displayed part 24*d* as the time interval between the current time and the point of time when the turn is expected to occur becomes shorter.

FIGS. 7A-7D are schematic diagrams showing another example of information displayed on the third display unit. The fourth displayed part 24*d* is comprised of small pieces that differ in thickness in the vertical direction. The small pieces are arranged in the direction of travel of the movable object 100, and the sequence of the small pieces is defined such that the larger the thickness, the more toward the front of the movable object 100 the piece is located. The small pieces are arranged to overlap each other in part. The controller 4 causes the small pieces to be displayed sequentially, beginning with the piece in the fourth displayed part 24*d* toward the back of the movable object 100. In other words, the controller 4 performs so-called sequential lighting. Referring to FIGS. 7A-7D, the right side in the figure is toward the back of the movable object 100. Sequential lighting can be performed when two or more small pieces are arranged to be displayed.

Figure 7A:
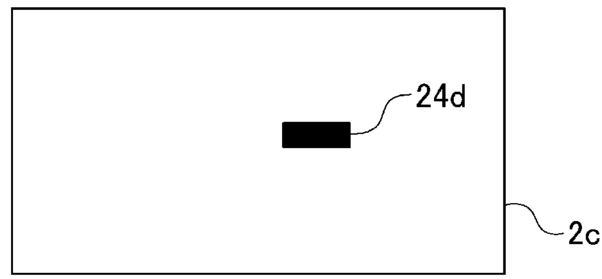
FIGS. 7A-7D are schematic diagrams showing another example of information displayed on the third display unit.
Figure 7B:
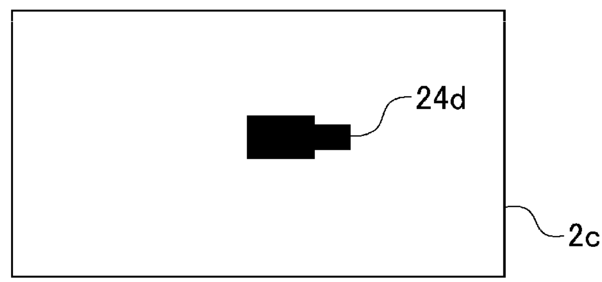
Figure 7C:
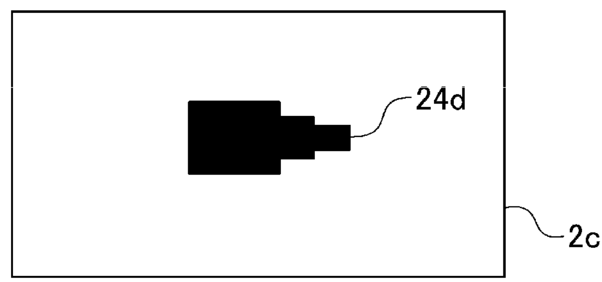
Figure 7D:
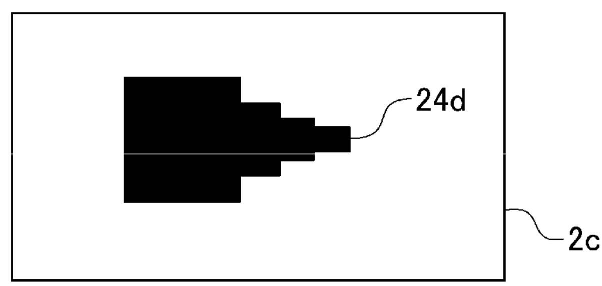

Further, the controller 4 increases the number of small pieces displayed, beginning with the piece toward the back of the movable object 100, as the movable object 100 approaches the position where the turn is expected to occur. In other words, the controller 4 causes only the first small piece located at the end toward the back of the movable object 100 to be displayed as shown in FIG. 7A, when the movable object 100 is at a first position spaced away from the position where the turn is expected to occur by a predetermined distance. When the movable object 100 moves to a second position closer to the position where the turn is expected to occur than the first position, the controller 4 causes the second small piece from the back of the movable object 100 to be displayed additionally, as shown in FIG. 7B. The same is true of the third and subsequent small pieces.

Seeing the forth displayed part 24*d* as a whole, the fourth displayed part 24*d* progressively extends and expands from the rear side to the front side of the movable object 100, as the position of the movable object 100 approaches the position where the turn is expected to occur. This makes it possible to present information such as the direction of turn and the timing of turn of the movable object 100 to people outside. It also enhances visual attraction to people outside. FIGS. 7A-7D do not show the third displayed part 24*c*, but the third displayed part 24*c* can be combined in this example, too. The same advantage is achieved by extending and expanding the fourth displayed part 24*d* as the time interval between the current time and the point of time when the turn is expected to occur becomes shorter.

As described above, the display device 1 for a movable object according to this embodiment includes the display unit 2 provided such that it is visible from outside the movable object 100, and the controller 4 that causes the display unit 2 to display information indicating a status of the movable object 100. Further, the controller 4 changes the display mode of the information displayed on the display unit 2 in accordance with the variation in the status of the movable object 100. Thus, by changing the display mode of the information in accordance with the variation in the status of the movable object, it is possible to present a larger amount of status information on the movable object to people outside such as a pedestrian and a passenger of another movable object around the movable object than the amount of status information that can be presented by a sign lamp mounted in the related-art movable object. Changing the display mode also enhances visual attraction to people outside. Accordingly, the safety of the movable object and people around is improved.

Further, the controller 4 according to this embodiment causes information indicating the current status or the future status of the movable object 100 to be displayed, as the information indicating the status of the movable object 100. In the case of causing the display unit 2 to display the information indicating the current status, the controller 4 changes the display mode of the information in accordance with the degree of the status. In the case of causing the display unit 2 to display the information indicating the future status, the controller 4 changes the display mode of the information in accordance with at least one of the interval between the position where the status is expected to occur and the current position of the movable object 100 and the interval between the point of time when the status is expected to occur and the current time. The embodiment as described above also improves the safety of people outside.

Alternatively, the controller 4 causes the information 22 indicating that the movable object 100 is decelerating to be displayed as the information indicating the current status. The controller 4 changes the display mode in accordance with the magnitude of deceleration. Further, the controller 4 changes the size of display in accordance with the magnitude of deceleration. The stop lamp mounted in the related-art movable object operates only in two modes (i.e., is either lighted or extinguished). It has therefore been difficult for people outside to determine the degree of deceleration of the movable object. Further, in the case the movable object is decelerated by using a regeneration brake or the like, it has sometimes been difficult to recognize that the object is decelerating in the first place. According to the display device 1 for a movable object of this embodiment, on the other hand, it is possible to let people outside know gradual or abrupt braking. Accordingly, the safety is further improved.

Further, the display device 1 for a movable object includes a brightness adjuster 20 that decreases the brightness of the display unit 2 as the size of display is increased. This inhibits the glare given to people outside by displaying information on the display unit 2. It also inhibits power consumption of the display unit 2.

Further, the controller 4 causes information indicating a turn of the movable object 100 to be displayed as information indicating a future status. The controller 4 changes the display mode in accordance with the distance between the position where the turn is expected to occur and the current position of the movable object or the time interval between the point of time when the turn is expected to occur and the current time. The information 24 indicating a turn includes the first displayed part 24*a* indicating the direction of travel of the movable object 100 and the second displayed part 24*b* indicating the direction of turn. Further, the controller 4 reduces the size of the first displayed part 24*a* as the current position of the movable object 100 approaches the position where the turn is expected to occur or as the current time approaches the point of time when the turn is expected to occur. The turn signal lamp mounted in the related-art movable object operates only in two modes (i.e., is either lighted or extinguished). It has therefore been difficult for people outside to determine the timing or direction of turn of the movable object accurately. According to the display device 1 for a movable object of this embodiment, on the other hand, it is possible to let people outside know the timing or direction of turn of the movable object 100 more accurately. Accordingly, the safety is further improved.

It is especially preferred to change the display mode in accordance with the status of the movable object 100 while the movable object 100 is being driven automatically. This makes it possible to present a larger amount of information on the movable object 100 being driven automatically to people outside and to further improve the safety of the movable object 100 and people outside.

Embodiment 2

The display device for a movable object according to embodiment 2 is similar in configuration to the display device 1 for a movable object according to embodiment 1 except that the display mode of information on the display unit 2 is different. Those features of the display device for a movable object according to embodiment 2 that are different from those of embodiment 1 will mainly be described. Common features will be described briefly, or a description thereof will be omitted.

Figure 8A:
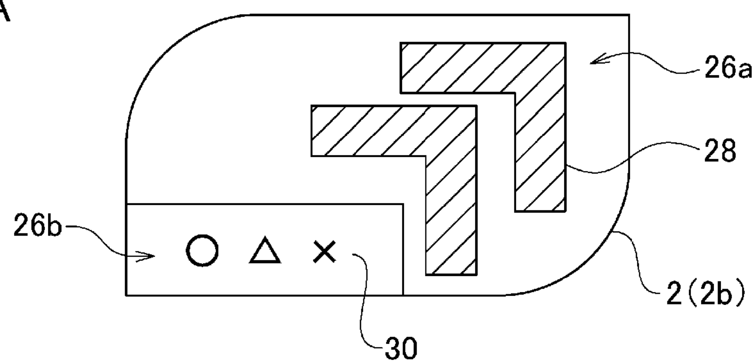
FIGS. 8A and 8B are schematic diagrams of a display unit provided in the display device for a movable object according to embodiment 2.
Figure 8B:
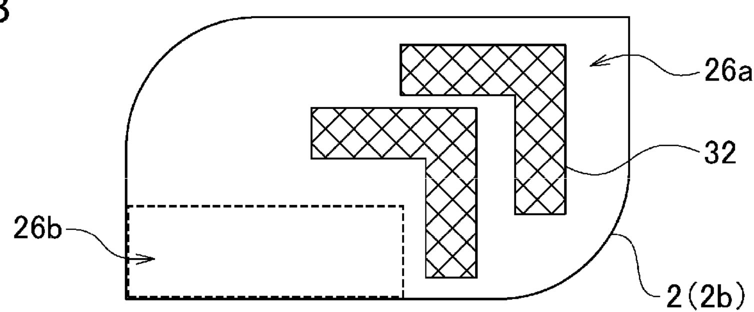

FIGS. 8A and 8B are schematic diagrams of a display unit provided in the display device for a movable object according to embodiment 2. FIGS. 8A and 8B show a second display unit 2*b* provided on the back surface of the movable object 100 by way of one example. The display unit 2 according to this embodiment includes a first area 26*a* and a second area 26*b*. The first area 26*a* is an area for displaying information indicating the status of the movable object 100. The second area 26*b* is an area for displaying information different from the information indicating the status of the movable object 100.

The status information on the movable object 100 displayed in the first area 26*a* is exemplified by information indicating that the back of the movable object 100 faces the viewer, i.e., information functioning as a rear sign lamp or a tail lamp. Further, information indicating that the movable object 100 is decelerating, i.e., information functioning as a stop lamp is given as an example. Further, the information different from the status information displayed in the second display area 26*b* is exemplified by advertisement, etc.

When information indicating a predetermined status of the movable object 100 is displayed in the first area 26*a*, the controller 4 prohibits display of information in the second area 26*b*. The predetermined status is exemplified by a status in which the movable object 100 is decelerating. In other words, as shown in FIG. 8A, the controller 4 causes information 28 that functions as a tail lamp to be displayed in the first area 26*a* when the movable object 100 is not decelerating. Further, the controller 4 causes advertisement information 30 to be displayed in the second area 26*b*. When deceleration of the movable object 100 is sensed based on a signal received from the acceleration sensor 6 or the brake system 8, the controller 4 causes information 32 that functions as a stop lamp to be displayed in the first area 26*a*, as shown in FIG. 8B. The information 32 that functions as a stop lamp is displayed with a brightness higher than that of the information 28 that functions as a tail lamp. Further, the controller 4 prevents the advertisement information 30 from being displayed in the second area 26*b*.

Thus, by providing the controller 4 with a display prohibition unit that prohibits information from being displayed in the second area 26*b* when the information indicating a predetermined status of the movable object 100 is displayed in the first area 26*a*, the attention of people outside is attracted to the information displayed in the first area 26*a*. It is therefore possible to let people outside recognize that the movable object 100 is in a predetermined status more properly. Consequently, the safety of the movable object and people around is improved. The information indicating a predetermined status of the movable object 100, which prohibits display of information in the second area 26*b*, may be information indicating a turn of the movable object 100, i.e., information that functions as a turn signal lamp.

It is especially preferred to exercise control according to this embodiment while the movable object 100 is being driven automatically. This makes it possible to present information on the movable object 100 being driven automatically to people outside more properly and to further improve the safety of the movable object 100 and people outside.

Figure 9A:
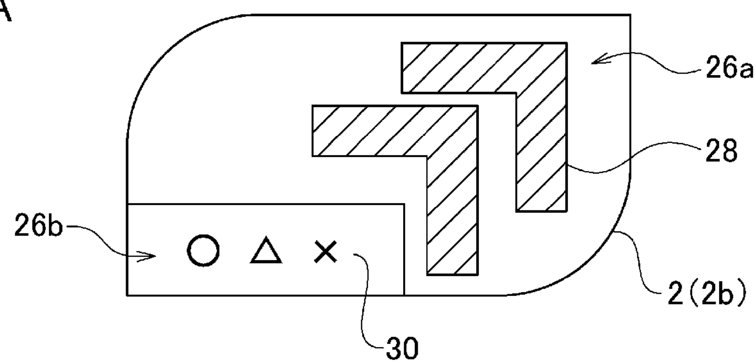
FIGS. 9A and 9B are schematic diagram of a display unit provided in the display device for a movable object according to a variation of embodiment 2.
Figure 9B:
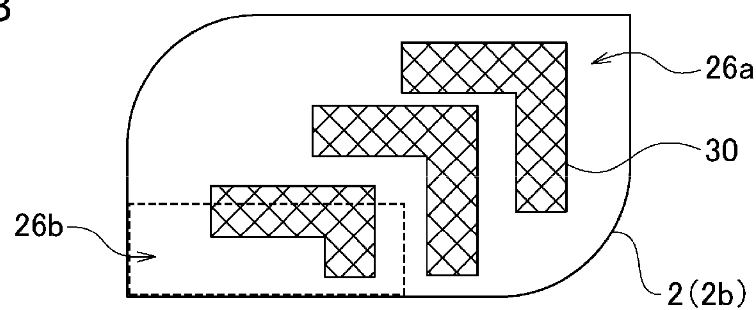

The following variations to the display device 1 for a movable object according to this embodiment are possible. FIGS. 9A and 9B are schematic diagram of a display unit provided in the display device for a movable object according to a variation of embodiment 2. FIGS. 9A and 9B show a second display unit 2*b* provided on the back surface of the movable object 100 by way of one example. The display unit 2 according to this variation includes a first area 26*a* and a second area 26*b*. As in the case of embodiment 2, the first area 26*a* is an area for displaying information indicating the status of the movable object 100. Meanwhile unlike the case of embodiment 2, the second area 26*b* according to this variation is not only capable of displaying information different from the information indicating the status of the movable object 100 but also the information indicating the status of the movable object 100. The status information on the movable object 100 is exemplified by information that functions as a tail lamp and information that functions as a stop lamp. The information different from the status information is exemplified by advertisement, etc.

When displaying information indicating a predetermined first status, the controller 4 causes that information to be displayed in the first area 26*a*. When displaying information indicating a predetermined second status, the controller 4 causes that information to be displayed in the first area 26*a* and the second area 26*b*. The predetermined first status is exemplified by a status in which the movable object 1 is not decelerating. The predetermined second status is exemplified by a status in which the movable object 1 decelerating. In other words, as shown in FIG. 9A, the controller 4 causes information 28 that functions as a tail lamp to be displayed only in the first area 26*a* when the movable object 100 is not decelerating. Further, the controller 4 causes the advertisement information 30 to be displayed in the second area 26*b*. When deceleration of the movable object 100 is sensed based on a signal received from the acceleration sensor 6 or the brake system 8, the controller 4 causes information 32 that functions as a stop lamp to extend across the first area 26*a* and the second area 26*b*, as shown in FIG. 9B.

Thus, by providing the controller 4 with a display switcher that causes particular information on the movable object 100 to be displayed in the second area 26*b* in addition to the first area 26*a*, it is possible to let people outside recognize that the movable object 100 is in the particular status more properly. Consequently, the safety of the movable object and people around is improved.

Embodiment 3

Figure 10A:
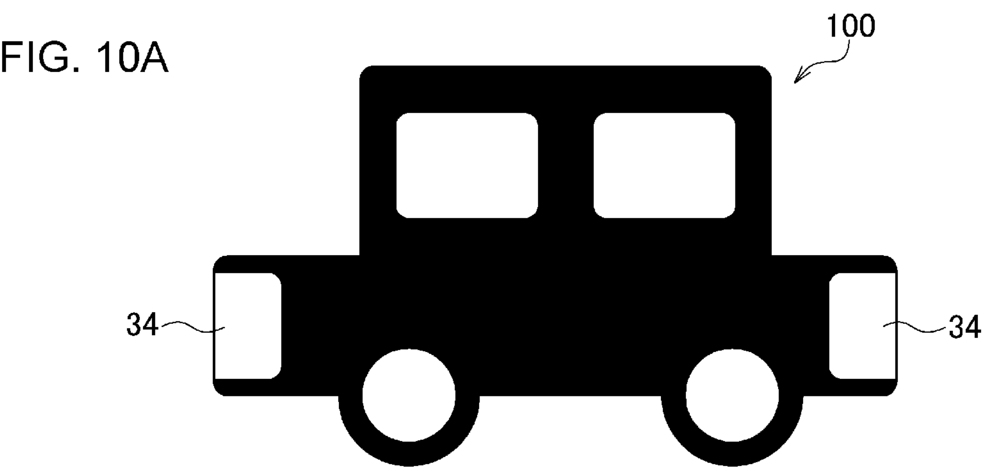
FIG. 10A shows an appearance of an example of the movable object in which the display device for a movable object according to embodiment 3 is mounted.
Figure 10B:
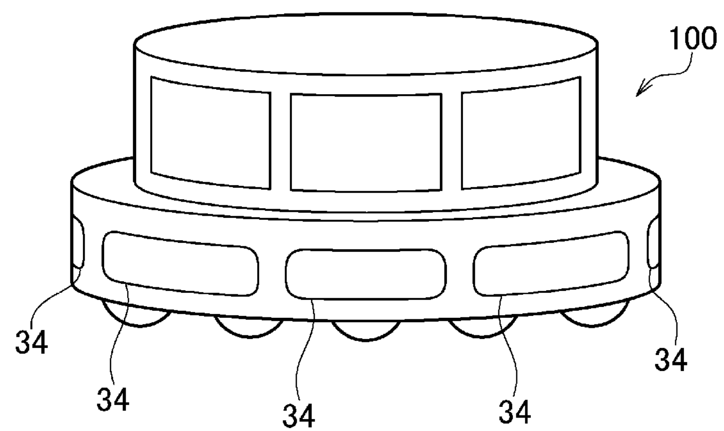
FIG. 10B shows an appearance of another example of the movable object in which the display device for a movable object according to embodiment 3 is mounted.
Figure 11:
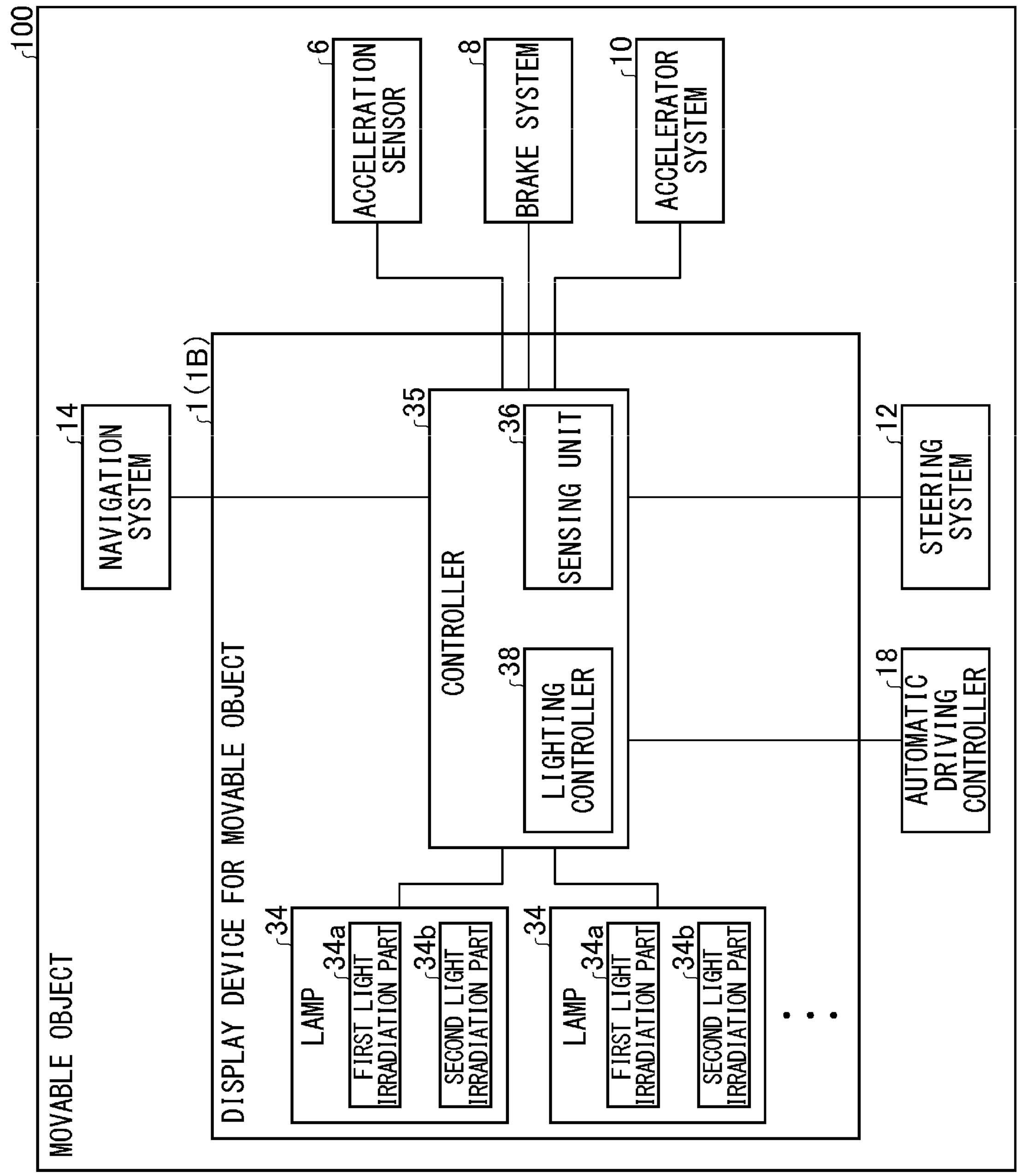
FIG. 11 is a functional block diagram for describing the display device for a movable object according to embodiment 3.

FIG. 10A shows an appearance of an example of the movable object in which the display device for a movable object according to embodiment 3 is mounted. FIG. 10B shows an appearance of another example of the movable object in which the display device for a movable object according to embodiment 3 is mounted. FIG. 11 is a functional block diagram for describing the display device for a movable object according to embodiment 3. FIG. 11 depicts the features as functional blocks. These functional blocks are implemented in hardware by a device or a circuit such as a CPU and a memory of a computer, and in software by a computer program, etc. It will be understood by those skilled in the art that the functional block may be implemented in a variety of manners by a combination of hardware and software.

The display device 1 (1B) for a movable object according to this embodiment includes a plurality of lamp 34 and a controller 35. As shown in FIGS. 10A and 10B, the plurality of lamps 34 are provided on the outer circumference of the movable object 100. FIG. 10A shows that the plurality of lamps 34 are mounted in the movable object 100 in which no distinction is made between front and back. The movable object 100 is capable of moving forward in the first direction or moving forward in the second direction opposite to the first direction. In this movable object 100, the lamp 34 is provided in a part of the movable object 100 facing the first direction and in a part facing the second direction. FIG. 10B shows that the plurality of lamps 34 are mounted in the movable object 100 in which there are no distinctions between orientations omnidirectionally. The movable object 100 is capable of moving forward in any direction. In this movable object 100, the lamps 34 are provided at predetermined intervals over the entire circumference of the movable object 100.

Each lamp 34 includes a first light irradiation part 34*a* and a second light irradiation part 34*b*. The first light irradiation part 34*a* irradiates light to be irradiated the space in front in the direction of travel of the movable object 100. The second light irradiation part 34*b* irradiates light to be irradiated the space behind in the direction of travel of the movable object 100. For example, the first light irradiation part 34*a* functions as a headlamp for securing viewability for the driver of the movable object 100. The second light irradiation part 34*b* functions as a rear sign lamp for displaying the orientation of the back of the movable object 100 for people outside. Each of the first light irradiation part 34*a* and the second light irradiation part 34*b* includes a plurality of light sources embodied by semiconductor light emitting elements such as LEDs and organic EL elements. Therefore, the lamp 34 is an LED array or an organic EL array. Further, the first light irradiation part 34*a* includes a light source with a higher light intensity than the second light irradiation part 34*b*.

Figure 12A:
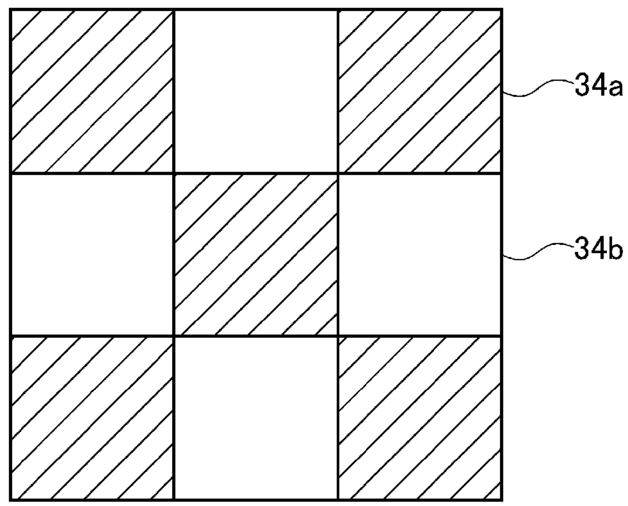
FIG. 12A is a front view schematically showing an example of the lamp.
Figure 12B:
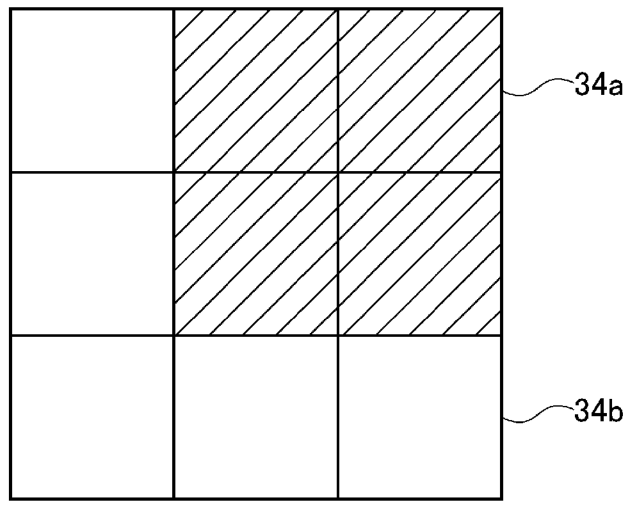
FIG. 12B is a front view schematically showing another example of the lamp.

FIG. 12A is a front view schematically showing an example of the lamp. FIG. 12B is a front view schematically showing another example of the lamp. As shown in FIG. 12A, light emitting elements forming the first light irradiation part 34*a* and light emitting elements forming the second light irradiation part 34*b* are arranged in a checkerboard pattern in the lamp 34 according to one example. As shown in FIG. 12B, light emitting elements forming the first light irradiation part 34*a* are localized in a predetermined area, and light emitting elements forming the second light irradiation part 34*b* are arranged in the remaining area in the lamp 34 according to the other example.

The controller 35 controls the lighting status of the lamps 34 in accordance with the direction of travel of the movable object 100 By way of one example, the controller 35 includes a sensing unit 36 and a lighting controller 38. The sensing unit 36 senses the direction of travel of the movable object 100. The acceleration sensor 6, the brake system 8, the accelerator system 10, the steering system 12, and the navigation system 14, etc. are connected to the sensing unit 36. The sensing unit 36 can sense the direction of travel of the movable object 100 by receiving a signal from the acceleration sensor 6. The sensing unit 36 can also sense the direction of travel of the movable object 100 by synthesizing the information acquired from the brake system 8, the accelerator system 10, the steering system 12, etc. The sensing unit 36 can also sense the direction of travel of the movable object 100 by receiving a signal from the navigation system 14.

The sensing unit 36 can also sense the direction of travel of the movable object 100 by using a gyro sensor, light detection and ranging or laser imaging detection and ranging (LIDAR), a millimeter-wave laser, an image sensor, etc.

The lighting controller 38 controls the lighting status of the lamps 34. More specifically, when a signal indicating the direction of travel of the movable object 100 is received from the sensing unit 36, the lighting controller 38 causes the first light irradiation part 34*a* to be lighted in the lamp 34 located forward in the direction of travel of the movable object 100. Further, the lighting controller 38 causes the second light irradiation part 34*b* to be lighted in the lamp 34 located rearward in the direction of travel of the movable object 100. In a configuration in which the lamps 34 are provided over the entire circumference of the movable object 100 as shown in FIG. 10B, a skilled person can appropriately define a range located forward in the direction of travel and a range located rearward in the direction of travel.

In other words, the lighting controller 38 switches between the headlamp function and the rear sign lamp function of each lamp 34, depending on the change in the direction of travel of the movable object 100. This can secure viewability for the driver of the movable object 100 and let people outside recognize the direction of travel of the movable object 100. Accordingly, the safety of the movable object 100 and people around is improved.

Further, an automatic driving controller 18 for controlling automatic driving of the movable object 100 is connected to the lighting controller 38. The movable object 100 according to this embodiment is capable of switching between automatic driving and manual driving. The lighting controller 38 can sense that the movable object 100 is driven automatically by receiving a signal from the automatic driving controller 18. The lighting controller 38 may exercise control to switch the function of each lamp 34 while the movable object 100 is being driven automatically. In this case, the headlamp function provided in the lamp 34 may be replaced by the front sign lamp function for displaying the orientation of the front of the movable object 100 to people outside. The front sign lamp function is exhibited by the light output by the first light irradiation part 34*a*. By exercising control of switching the function of the lamp 34 during automatic driving, it is possible to let people outside recognize the direction of travel of the movable object 100.

As described above, the display device 1 for a movable object according to this embodiment (which could be referred to as lamp device for a movable object) is provided with the plurality of lamps 34 and the controller 35. The plurality of lamps 34 are provided on the outer circumference of the movable object 100, and each of the lamps 34 includes the first light irradiation part 34*a* that irradiates light to be irradiated the space in front in the direction of travel of the movable object 100 and the second light irradiation part 34*b* that irradiates light to be irradiated the space behind in the direction of travel of the movable object 100. The controller 35 senses the direction of travel of the movable object 100 and controls the lighting status of the lamps 34 to light the first light irradiation part 34*a* of the lamp 34 located forward in the direction of travel of the movable object 100 and light the second light irradiation part 34*b* of the lamp 34 located rearward in the direction of travel of the movable object 100.

According to the display device 1 for a movable object according to this embodiment, the headlamp or the front sign lamp can be located forward in the direction of travel of the movable object 100 even when the direction of travel of the movable object 100 is switched. It is also possible to locate the rear sign lamp rearward in the direction of travel of the movable object 100. This can secure viewability for the driver of the movable object 100 and let people outside recognize the direction of travel of the movable object 100. Accordingly, the safety of the movable object 100 and people around is improved.

Further, the lamp 34 is structured such that the first light irradiation part 34*a* exhibiting the headlamp function or the front sign lamp function and the second light irradiation part 34*b* exhibiting the rear sign lamp function are integrated. Accordingly, the size of the lamp is prevented from growing.

The present invention is not limited to the embodiments described above and the embodiments may be combined, or modifications such as design changes may be made based on the knowledge of a skilled person. New embodiments resulting from such combinations or modification are also encompassed by the scope of the present invention. Such new embodiments will provide the combined advantages of the embodiment and the variation combined.

What is claimed is:

1. A display device for a movable object comprising:
- a display unit provided such that it is visible from outside a movable object; and
- a controller that causes the display unit to display information indicating a status of the movable object, wherein
- the controller changes a display mode of the information displayed on the display unit in accordance with variation in the status of the movable object,
- the controller causes information indicating a future status of the movable object to be displayed, as the information indicating the status of the movable object,
- the controller changes the display mode of the information in accordance with at least one of an interval between a position where the status is expected to occur and a current position of the movable object and an interval between a point of time when the status is expected to occur and a current time.

2. A display device for a movable object comprising:
- a display unit provided such that it is visible from outside a movable object; and
- a controller that causes the display unit to display information indicating a status of the movable object, wherein
- the controller changes a display mode of the information displayed on the display unit in accordance with variation in the status of the movable object, wherein
- the controller causes information indicating a turn of the movable object to be displayed as information indicating a future status and changes the display mode in accordance with a distance between a position where the turn is expected to occur and a current position of the movable object.

3. The display device for the movable object according to claim 2, wherein
- the information indicating the turn includes a first displayed part indicating a direction of travel of the movable object and a second displayed part indicating a direction of turn, and
- the controller reduces a size of the first displayed part as the current position of the movable object approaches the position where the turn is expected to occur.

4. A display device for a movable object comprising:
- a display unit provided such that it is visible from outside a movable object; and
- a controller that causes the display unit to display information indicating a status of the movable object, wherein
- the controller changes a display mode of the information displayed on the display unit in accordance with variation in the status of the movable object, wherein
- the display unit includes a first area for displaying the information indicating the status of the movable object and a second area for displaying information different from the information indicating the status of the movable object, and when information indicating a predetermined status of the movable object is displayed in the first area, the controller prohibits display of information in the second area.

5. A display device for a movable object comprising:

a display unit provided such that it is visible from outside a movable object; and a controller that causes the display unit to display information indicating a status of the movable object, wherein the controller changes a display mode of the information displayed on the display unit in accordance with variation in the status of the movable object, wherein the display unit includes a first area for displaying the information indicating the status of the movable object and a second area for displaying the information indicating the status of the movable object and information different from the information indicating the status of the movable object, and the controller causes information indicating a predetermined first status to be displayed in the first area and causes information indicating a predetermined second status to be displayed in the first area and in the second area.

6. A display device for a movable object comprising:

a plurality of lamps provided on an outer circumference of the movable object, each of the lamps including a first light irradiation part that irradiates light to be irradiated a space in front in a direction of travel of the movable object and a second light irradiation part irradiates light to be irradiated a space behind in the direction of travel of the movable object;

a sensing unit that senses the direction of travel of the movable object; and a lighting controller that controls a lighting status of the lamps in such a manner as to light the first light irradiation part of the lamp located forward in the direction of travel of the movable object and lights the second light irradiation part of the lamp located rearward in the direction of travel of the movable object.

* * * * *